(12) United States Patent
May

(10) Patent No.: US 6,817,723 B1
(45) Date of Patent: Nov. 16, 2004

(54) BACKUP LIGHT SOURCE

(75) Inventor: Gregory J. May, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/759,446

(22) Filed: Jan. 14, 2004

(51) Int. Cl.[7] .................. G03B 21/20; G03B 21/26; G09G 5/00; G02F 1/1335; H04N 5/74

(52) U.S. Cl. .................. 353/85; 353/94; 349/5; 348/751; 345/207

(58) Field of Search .................. 353/85, 94, 121; 345/207, 211, 214; 348/751; 349/5

(56) References Cited

U.S. PATENT DOCUMENTS

| | | | | |
|---|---|---|---|---|
| 5,994,791 A | * | 11/1999 | Rayner | 307/31 |
| 6,467,911 B1 | * | 10/2002 | Ueyama et al. | 353/87 |
| 6,540,363 B1 | * | 4/2003 | Steffensmeier | 353/31 |
| 6,666,896 B1 | * | 12/2003 | Peng | 353/94 |
| 6,733,139 B2 | * | 5/2004 | Childers et al. | 353/94 |
| 6,758,579 B2 | * | 7/2004 | Ishikawa et al. | 362/238 |

* cited by examiner

*Primary Examiner*—Judy Nguyen
*Assistant Examiner*—Melissa J Koval

(57) ABSTRACT

A projection system is configured to activate a backup light source in the event that a primary light source is non-operational. The backup light source provides a light that allows a message to be projected indicating the primary light source has failed.

41 Claims, 4 Drawing Sheets

BACKUP LIGHT SOURCE

BACKGROUND

Large screen televisions are a part of many multimedia systems. A popular choice of large screen televisions is the projection television system (projection TV). A projection TV is able to provide larger viewable images than conventional cathode ray tube (CRT) systems, and is less costly than current plasma display systems.

Projection TVs are projection systems that provide viewable images by generating a small image, then projecting the image onto a larger display screen seen by viewers. A light source, generated usually by a mercury lamp or bulb (primary bulb), shines light on the generated image which is reflected or transmitted onto the display screen.

The primary bulb may provide around 2500 service hours, and is expected to be replaced when it fails to function. Because of the primary bulb's relatively high price, a spare typically is not kept. When the primary bulb fails, a replacement is ordered. The ease of replacing the primary bulb depends on the particular projection system and the capability of the user.

In the case of a home entertainment system, an average user may rot have the capability to replace the bulb or easily recognize a burned-out bulb as a possible cause of the failure. When the bulb fails, no images are seen on the display screen. The user suspects a malfunction with the projection system; however, the user may or may not suspect that the primary bulb needs to be replaced. Bringing in the projection system for service may not be a viable option, because of the relatively large size of the projection system.

In certain projection systems, a "bulb out" indicator is displayed to the viewer through an interface on a unit containing the projection system. Although the user may know that the primary bulb needs to be replaced, the user may not be inclined to perform the replacement and may desire to contact the appropriate party. Usually the appropriate party may be an installer that set up the projection system; however, the user may not have the information to contact the appropriate party.

There may be other conditions that prevent images from being projected and prevent the primary bulb from activating. For example, the primary bulb may not be activated because of a stuck or failed cooling fan. Since primary bulbs may generate considerable heat, a cooling fan cools the primary bulb to prevent it from overheating and "burning out". The projection system may determine that the cooling fan is inoperative and prevent the primary bulb from activating. The primary bulb does not need to be replaced; however, the user sees no images projected and may presume a faulty primary bulb that is to be replaced. Buying a replacement primary bulb may be a costly way to find out that the current primary bulb is still functional.

For certain projection systems, fault information provides conditions that are being experienced that affect operation of the projection systems, such as stuck fan conditions that prevent the primary bulb from activating. Fault information may include corrective action(s) to address the condition(s). Therefore when a condition exists that prevents the primary bulb from activating, fault information may be available to troubleshoot a cause of the condition. However, if the primary bulb is inactive, there may be no way to display the fault information on the display screen seen by viewers. A secondary viewing system may be implemented which displays the fault information; however, such a secondary viewing system may include additional viewing screens (e.g., a display on the unit housing the projection system), different optical elements, and various input/output interfaces that add considerable costs to the projection system.

Accordingly, the need exists for new and improved systems and methods to provide a message indicating when the primary light source in a projection system is out.

SUMMARY

A projection system is configured to activate a backup light source in the event that a primary light source is non-operational. The backup light source provides a light that allows a message to be projected indicating the primary light source has failed.

BRIEF DESCRIPTION OF THE DRAWINGS

The following detailed description refers to the accompanying figures. In the figures, the left-most digit(s) of a reference number identifies the figure (Fig.) in which the reference number first appears. Moreover, the same reference numbers are used throughout the drawings to reference like features and components.

DETAILED DESCRIPTION

Overview

The following discussion is directed to systems and methods for providing a backup light source and message in the event a primary light source in a projection system fails to activate. By providing a backup light source, a message is displayed to a user indicating that the primary light source has failed or is "out". The displayed message is projected onto the same display screen that projected images are typically displayed when the primary light source is operational. For certain embodiments, fault information may be displayed and viewed by a user. For other embodiments, the backup light source may display information from a mask or light template that conveys that the primary light source is out.

Exemplary System Environments

Figure 1:
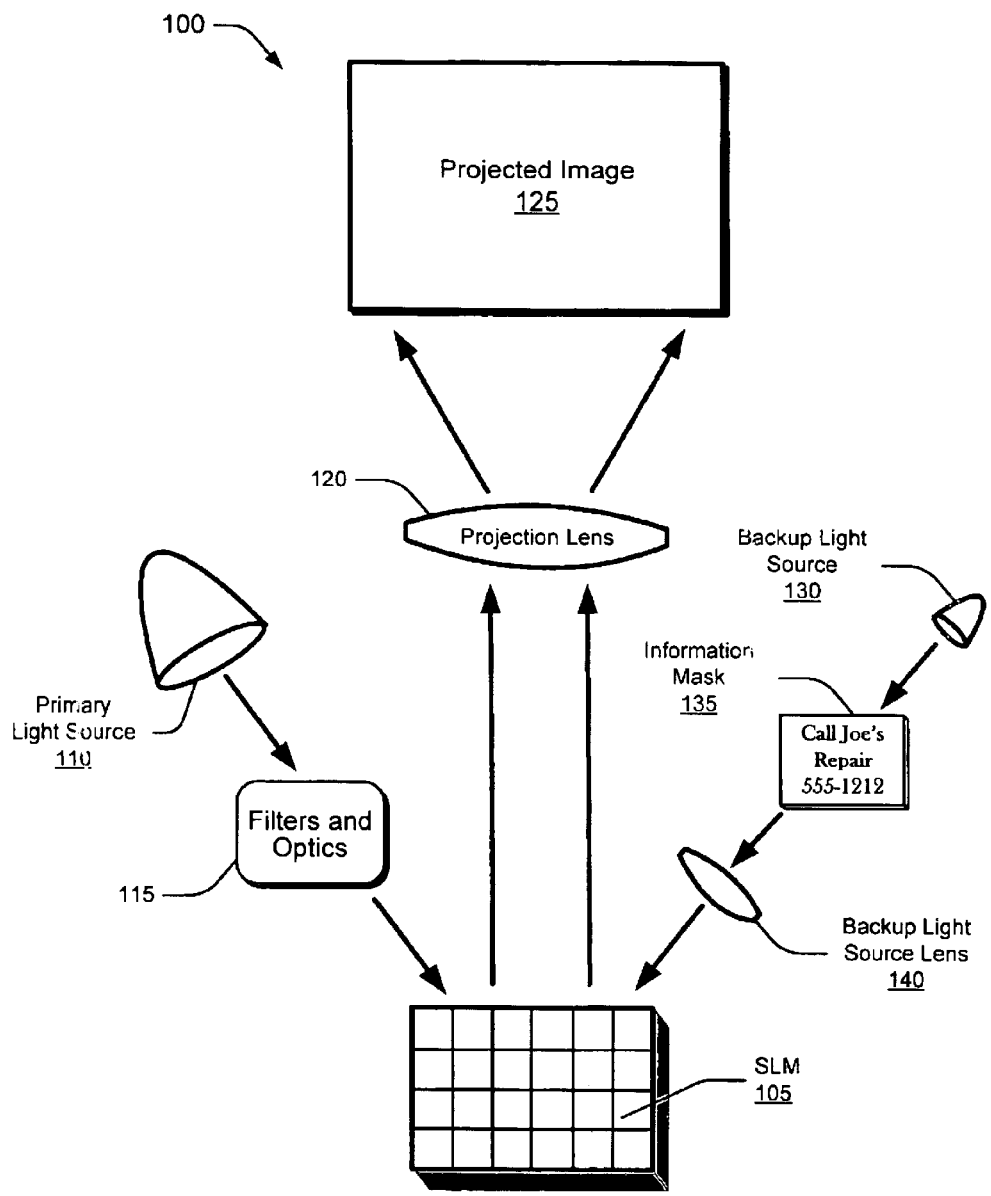
FIG. 1 is a block diagram illustrating an exemplary projection system that includes a spatial light modulator.

FIG. 1 shows an exemplary projection system 100 with a spatial light modulator (SLP) and a backup light source. In general SLMs are used to control light on a pixel-by-pixel basis in technologies related to optical data processing, adaptive optics, optical correlation, machine vision, and displays. SLMs include digital modulator devices or digital micro-mirror devices known as DMDs.

A single SLP projection system 100 is shown as an example; however, it is contemplated that multiple SLMs such as a three SLM projection system may employ the methods and systems described.

Projection systems such as projection television systems may use one or more SLMs, such as a DMD. DMD and digital light processing (DLP™) are well known technology developed by the Texas Instruments Corporation. A DMD is a chip that includes of 800 to 1 million mirrors where each mirror represents an image pixel. Each mirror in the DMD is controlled or switched to either reflect light or not to reflect light from a light source. This switching may take place thousands of times per second. The number of times a mirror switches on (reflects light) and switches off (not reflect light) translates to a particular gray scale when white light is reflected. The mirrors of a DMD are controlled by a processor as discussed below. In this particular embodiment, a single SLM 105 is used.

A primary light source 110 may include a relatively high-power, heat-generating mercury lamp or bulb. Primary light source 110 may include a light ballast that may or may not be included with the bulb. In one embodiment the light ballast is a separate replacement item from the bulb.

Light from primary light source 110 is directed to SLM 105. However, prior to being received at SLM 105, light from the primary light source 110 is shown through a set of filters and optics 115. In particular a color wheel filter is included in filters and optics 115. The color wheel is coordinated with the SLM 105 to filter out particular colors, and mirrors of SLM 105 are turned on to reflect colors for particular image pixels. In other words, when a particular color is passed through the color wheel, only mirrors that represent an image pixel with that color are turned on. Filters and optics 115 may also include various shaping and condensing lenses.

The image seen at SLM 105 is a scaled version to be displayed to a user. The light or reflected image from SLM 105 is sent to a projection lens 120 which magnifies the scaled image and projects a projected image 125 that is viewed by a user.

A backup light source 130 is included in projection system 100. Backup light source 130 may include one or more bulbs. It is contemplated that the bulbs consume relatively little power (e.g., approx. 100 mA). The bulbs of backup light source 130 may include low-powered light emitting diodes (LEDs) and laser diodes. It is contemplated that backup light source 130 remains inactive as long as primary light source 110 is operational and turns on when primary light source 110 fails to activate. However, the backup lamp can be used to signal to the user other conditions when no failure mode exists. This might include "power on—please wait" as the bulb is powered on.

In certain embodiments, an information mask or light template 135 may be included. A message is etched out or masked into light template 135. The message is etched out on light template 135 such that light is allowed to shine through the letters (or symbols) of the message. Light template 135 may be affixed on a holder (not shown) between backup light source 130 and SLM 105. Different messages may be provided by changing the light template 135.

An example of a light template 135 is a custom template (or calling card) placed by a party that performed original installation projection system 100. When backup light source 130 activates, its light is shown through the message etched into light template 135 creating a transmitted light message.

Light template 135 may include contact information for a user in the event the primary light source 110 fails to activate. In addition to contact information, basic failure information may be included to alert the user of a general condition that the primary light source 110 has failed to activate. In this example, the information conveys "Call Joe's Repair, 555-1212". Other examples of messages include "Primary Light Source Out, Change Light Bulb".

A lens 140 may be used to define or focus the transmitted light message prior to being received by SLM 105. In the case of a DMD used as an SLM, either the entire set or a subset of the mirrors of the DMD are set to reflect the transmitted light message of light template 135 when backup light source 130 is activated. The transmitted light message is reflected off the appropriate mirrors and magnified and projected by projection lens 120 for display as projected image 125. If a subset of the mirrors of the DMD is used to reflect the transmitted light message, the message is displayed as a portion of the space that projected image 125 occupies when primary light source 110 is operational.

In other embodiments, fault information is provided to a user by projection system 100 as projected image 125. When primary light source 110 becomes inactivate or fails to activate, backup light source 130 is activated, and shines a direct light onto SLM 105 without the information mask 135. SLM 105 is manipulated to convey a fault message or messages which is magnified and projected by projection lens 120 for display as projected image 125 which may be read by a user or service person. The fault information may convey particular conditions, such as a stuck cooling fan or faulty bulb that prevent primary light source 110 from activating.

Figure 2:
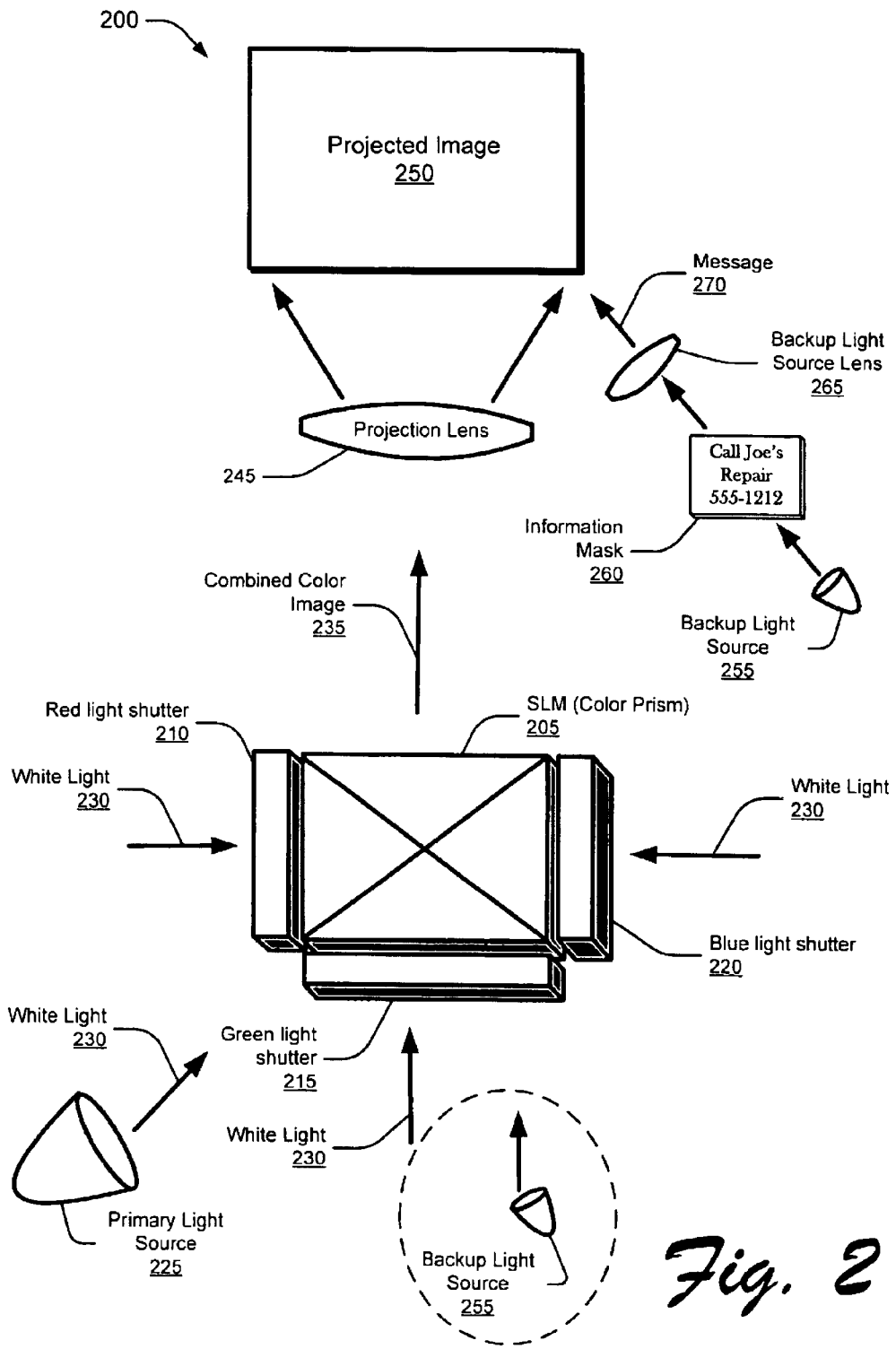
FIG. 2 is a block diagram illustrating an exemplary projection system that includes a color prism with three color modulators.

FIG. 2 shows a projection system 200 with color prism with three color modulators. Projection system 200 uses light shutter mechanisms (light shutters) that include LCDs that are made up of pixels. Each light shutter is configured to filter or pass a particular color light: red, green, or blue. A light shutter or SLM 205 further processes an image in a particular color. In this example SLM 205 includes a red light shutter 210, a green light shutter 215, and blue light shutter 220.

A primary light source 225 provides a white light 230 which may be reflected or refracted by mirrors (not shown) or other devices such that white light 230 is passed through light shutters 210, 215, and 220. Red light shutter 210 receives white light 230 and passes red light and processes a red light image. Blue light shutter 215 receives white light 230 and passes blue light and processes a blue light image. Green light shutter 220 receives white light 230 and passes green light and processes a green light image.

The different color images are combined and sent from SLM 205 as a combined color image 235. Color image 235 may be processed through a projection lens 245 and shown as a projected image 250.

Similar to backup light source 130 of FIG. 1, a backup light source 255 is included in projection system 200. Backup light source 255 may include one or more bulbs. It is contemplated that the bulbs consume relatively little power (e.g., approx. 100 mA). The bulbs may include low-powered light emitting diodes (LEDs) and laser diodes. In one embodiment backup light source 255 works in conjunction with primary light source 225 to convey a message.

It is contemplated that backup light source 255 remains inactive as long as primary light source 225 is operational and turns on when primary light source 225 fails to activate.

Similar to the light template 135 described in FIG. 1 a light template or information mask 260 may be part of certain embodiments of projection system 200. Light template 260 may be placed in a holder and replaced with other templates with different messages. A transmitted light message is passed through light template 260. A focusing lens 265 may be used to define or focus the transmitted light message as a projected message 270 onto a projection screen directly.

In another embodiment, an electronic version of template 260 could be generated using one of the light shutters 210, 215, or 220 such that a custom message may be presented. The color of the message would be the color path chosen to implement this method (i.e., a red, green, or blue). It is preferred to use the green light shutter 215 as the color for the message, since it may be easier to read for a user. In this embodiment backup light source 255 shines its light directly through the chosen shutter mechanism.

The colored transmitted message is sent through the color prism 205 transmitted to and magnified by projection lens 245 and shown as projected image 250.

Figure 3:
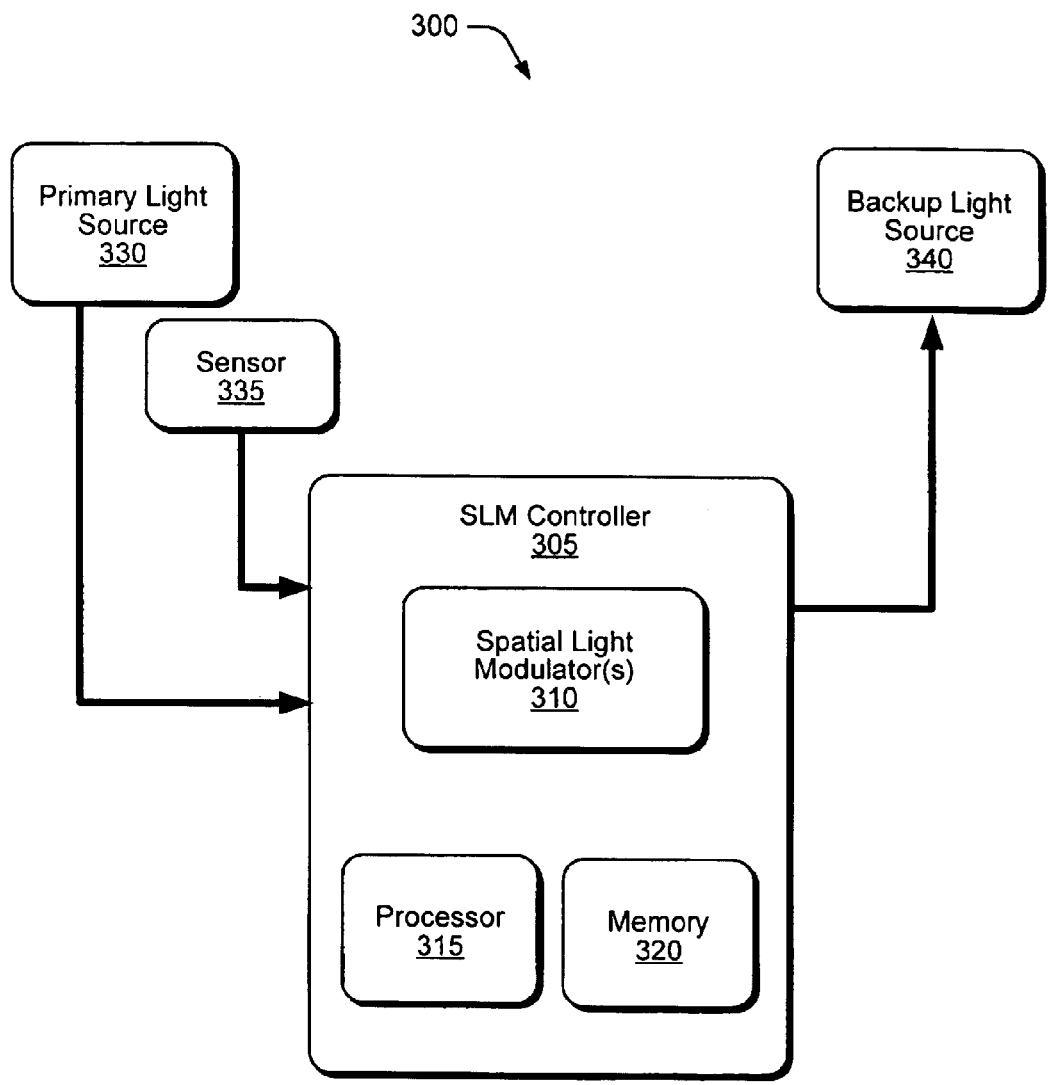
FIG. 3 is a block diagram illustrating input and output control of an exemplary projection system.

FIG. 3 shows control input and output of an exemplary projection system 300. Projection system 300 includes control of input and output of the projection system 100 of FIG. 1 and the projection system 200 of FIG. 2. Projection system 300 may include front and rear projection systems.

Projection system 300 includes a SLM controller 305. SLM controller 305 includes one or more SLMs 310. SLM controller may include hardware, software, firmware, logic, or a combination. Projection system 300 includes one or more processors 315, and memory 320. Processors 315 (e.g., microprocessors, controllers, and the like) process various instructions and commands to control the operation of projection system 300, and allow projection system 300 to communicate with other electronic and computing devices.

Processors 315 are configured to control SLMs 310. Specifically, the SLMs 310 are configured to receive input (i.e., instructions or commands) from processors 315 to turn on or turn off (i.e., reflect or not to reflect light from a light source) in order to reflect images and messages. For example, a video device such as a digital versatile disc (DVD) player provides video input to projection system 300, and processors 315 control the SLMs 310 to reflect light and color to create the images. In the case of when a single SLM is used, processors 315 also control color wheels or filters as shown and described in filters and optics 115 of FIG. 1. In the case of multiple SLMs, for example three DMDs, processors 315 provide controls for each DMD to adjust their mirrors to properly reflect particular color light that is received.

Projection system 300 may be implemented with one or more memory components shown as memory 320 that may be written to and read by processors 315. Examples of memory 320 include random access memory (RAM), disc storage devices, and non-volatile memory (e.g., read-only memory (ROM), flash memory, EPROM, EEPROM, etc.).

SLM controller 305 is responsive to various component and device inputs and outputs, where components and devices may be part of projection system 300 or external to projection system 300. Examples of internal projection system 300 components include power supplies, motors, and cooling fans. External devices include audio devices, video input devices (e.g., DVD players, digital cameras, video cameras, etc.), remote control devices, and cable box devices.

Projection system 300 includes a primary light source 330 which includes and describes primary light source 110 of FIG. 1 and primary light source 225 of FIG. 2. Primary light source 330 may interface directly to SLM controller 305 and provide input as to operating status of primary light source 330. Alternatively, the operating status of primary light source 330 may be determined by SLM controller 305 through sensor 335 which provides an input to SLM controller 335. Sensor 335 may be a heat sensing or optical sensing device. In other words, sensor 335 specifically measures a physical condition of primary light source 330 such as heat since primary light source 330 is expected to generate measurable heat, or light when primary light source 330 is turned on.

In the event that primary light source 330 is not activated, primary light source 330 may provide an input to SLM controller 305 indicating that it is inoperative. Alternatively, sensor 335 may sense no physical output (i.e, no heat or light) coming primary light source 330 and provides an input to SLM controller 305 as to primary light source 330's inactivity.

Upon receiving an input indicating inactivity at primary light source 330, SLM controller 305 sends a command to a backup light source 340 to turn on. Backup light source 340 includes backup light source 130 of FIG. 1 and backup light source 255 of FIG. 2.

Alternatively when an electronic version of the error message is implemented, processors 315 provide a command (i.e, instructions) for SLMs 310 to transmit the light message sent from the light template. In the other words, the SLMs 310 are directed to the transmitted light message, and the reflected message is projected to the user as described above. When multiple SLMs are used, a particular SLM is selected to be controlled by processors 315. The selected SLM transmit the light message from the light template. An SLM such as a DMD may also be used as a plain mirror and reflect a message or it may be modulated in receiving light from a backup light. Alternatively, when a color prism is used, processors 315 provide a command for a shutter (e.g. a green shutter) to pass the light message from the light template.

Processors 315 may further receive fault information from other components included in projection system 300. An example of fault information may include a stuck cooling fan condition that causes primary light source 330 to shut down or to be nonoperational. Processors 315 may cause fault information to be stored and recalled from memory 320. Fault information is conveyed by processors 315 controlling an SLM of SLMs 315. Mirrors of one of the DMDs 310 are turned on and off to reflect light from a source such as primary light source 330 or backup light source 340. Alternatively, processors 315 may a control a shutter of a SLM to convey the fault information.

In certain cases, primary light source 330 may be operational and a condition takes place that affects projection system 300. An example includes a faulty power supply condition (i.e., projection system 300 is using backup power). For these cases, primary light source 330 may be used to provide light to an SLM of SLMs 310 to convey fault information messages. However, in the event that primary light source 330 becomes inoperative, backup light source 340 may be used to provide light to convey fault information messages.

Figure 4:
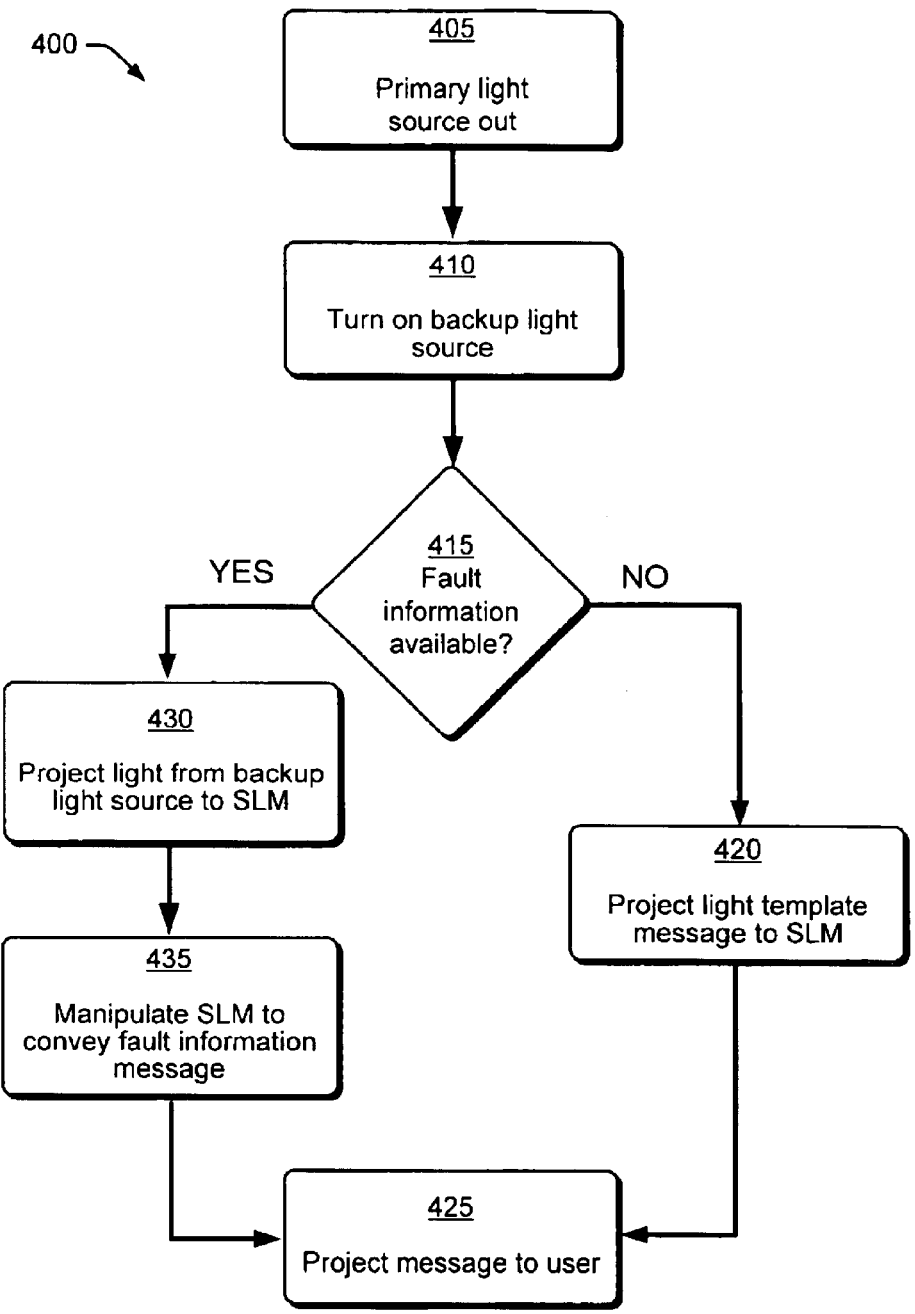
FIG. 4 is a flow chart illustrating a process that provides a backup light source and message in a projection system in the event the primary light source is inoperative.

FIG. 4 shows an exemplary process 400 to provide a backup light source and display a message when a primary light source is inoperative. Exemplary process 400 may be included in projection system 100 of FIG. 1, projection system 200 of FIG. 2, and projection system 300 of FIG. 3. Furthermore, projection systems 100 of FIG. 1, 200 of FIG. 2, and 300 of FIG. 3 may be implemented with mechanisms and functions for performing process 400.

At block 405, a determination is made that a primary light source such as primary light source 110 of FIG. 1, primary light source 225 of FIG. 2, and primary light source 330 of FIG. 3, in a projection system (e.g., projection system 100 of FIG. 1, projection system 200 of FIG. 2, and projection system 300 of FIG. 3) is inoperative. The inoperative condition may be a result of lamp or bulb being "out" and needs to be replaced, or some other condition that prevents the primary light source from turning on. The determination may be made directly by the primary light source by an input to a processor or controller such as processors 315 of FIG. 3.

At block 410, a backup light source is turned on. The backup light source includes backup light source 130 of FIG. 1, backup light source 255 of FIG. 2, and backup light source 340 of FIG. 3. The backup light source remains deactivated until a determination is made that the primary light source is inactive. The backup light source is not intended to take the place of the primary light source, but is used to convey messages indicating a problem with the primary light source. The backup light source is further used to provide contact information or fault information to be used in addressing the condition or conditions that caused the primary light to become inactive. As discussed above, the backup light source may include one of various devices such as a laser diode and LEDs.

At block 415, a decision is made if fault information is available for the projection system. As discussed above, fault information conveys particular conditions that affect the performance of the projection system. When the primary light source becomes inoperative, fault information may be able to convey the particular causes of the condition. In the case of a primary light source, fault condition may indicate that the lamp or bulb actually is bad and needs to be replaced, or another condition such as a stuck cooling fan that prevents the primary light source from become active.

If fault information is not available (i.e, following the "NO" branch of block 415), a light template (e.g., light template 135 of FIG. 1 and light template 260 of FIG. 2) may be used to convey a transmitted light message that the primary light source is out and/or provide contact information to the user as to a party that is capable of fixing the condition. An SLM may convey the standard default error message as well. The light template could be used if other fault information occurs that perhaps does not allow the DMD to function correctly.

At block 420, the transmitted light message from the light template is reflected off mirrors of a DMD such as DMD 105 of FIG. 1 or passed through a color shutter such as green light shutter 230 of FIG. 2. As described above, the transmitted light message from the light template may be shaped with optics prior to receipt at the DMD or color shutter. As also discussed above, in the case of a multiple SLMs one of the SLMs is chosen to transmit (i.e., reflect) the message. In other words, the SLMs are modulated appropriately to convey the message.

At block 425, the transmitted light message from the light template is projected from the SLM through a projection lens and displayed as a viewable image to a user.

If fault information is available (i.e., following the "YES" branch of block 415), a controller such as controller 305 which includes processors 315 of FIG. 3, manipulates an SLM to convey the fault information.

At block 430, light from the activated backup light source is received at a DMD or color shutter. In the case of multiple SLMs one SLM may be used to convey fault information. As discussed above, multiple SLMs provide dedicated SLMs for each primary color. When fault information is to be displayed, a single primary color may be sufficient to convey the fault information (i.e., use of one color shutter). In other words, fault information may include alpha numeric messages that may be displayed with any of the primary colors. The light, either direct or refracted (e.g., refracted light when a color prism is used) from the backup light source is received by the DMD.

At block 435, a controller or processor such as processors 315 of FIG. 3, manipulates an SLM to convey fault information messages. Fault information is received from various components in the projection system and may be stored, and accessed by the controller and processor. A user may be provided with an interface to the projection system to allow for selectively accessing and manipulating the fault information. For example, through the interface the user may be able to scroll through and select from a list of error code information included with the fault information.

Whatever fault information to be conveyed to the user is provided as projected message to the user as described at block 425. The fault information is conveyed as reflected light from the DMD mirrors or color shutter and projected through a lens and displayed as a projected image to the user.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A projection system comprising:
   a primary light source;
   a backup light source;
   a spatial light modulator; and
   a controller configured to determine if the primary light source has failed, activate the backup light source, and project a message from the spatial light modulator to a screen that the primary light source has failed.

2. The projection system of claim 1 wherein the backup light source is a low-power light source.

3. The projection system of claim 1 wherein the backup light source is a light emitting diode.

4. The projection system of claim 1 wherein the spatial light modulator comprises a digital modulator device comprising a set of mirrors wherein the message is projected off the set of mirrors.

5. The projection system of claim 1 further comprising an LCD that projects the message.

6. The projection system of claim 1 wherein the message is part of fault information and the controller is configured to manipulate a set of mirrors to display the message.

7. The projection system of claim 1 wherein light from the backup light source is used by the spatial light modulator to project the message.

8. The projection system of claim 1 wherein the message is projected without the use of the SLM.

9. The projection system of claim 1 wherein the message is projected using a template mask.

10. The projection system of claim 9 wherein the template mask is removable.

11. A method for indicating a primary light source out condition comprising:
    determining that a primary light source has failed;
    activating a backup light source;
    conveying a message; and
    projecting a message that the primary light source is out to a screen used to show projected images from the primary light source.

12. The method of claim 11 wherein the determining is performed by the primary light source indicating a non-operation condition.

13. The method of claim 11 wherein the determining is performed by a sensor configured to receive a physical input from the primary light source.

14. The method of claim 13 wherein the sensor is a thermal sensor.

15. The method of claim 13 wherein the sensor is an optical sensor.

16. The method of claim 11 wherein the message is included in fault information.

17. The method of claim 11 wherein the projecting comprises transmitting the message through a light template.

18. The method of claim 11 wherein the projecting comprises reflecting the message off mirrors of a DMD.

19. The method of claim 11 wherein the projecting comprises transmitting the message through a color shutter of a color prism.

20. The method of claim 11 wherein the message is projected directly to the screen.

21. The method of claim 11 wherein the message is projected through a template mask.

22. The method of claim 21 wherein the template mask is removeable.

23. A projection system that comprises the method of claim 11.

24. The projection system of claim 23 wherein the projection system is a rear projection system.

25. The projection system of claim 23 wherein the projection system is a front projection system.

26. A processor-readable medium comprising processor-executable instructions for indicating that a primary light source is out, the processor-executable instructions comprising instructions for:

determining that a primary light source is not operational;

activating a backup light source;

conveying a message; and projecting a message to a screen using light from the backup light source indicating that the primary light source is out.

27. The processor-readable medium of claim 26 wherein the determining is performed by the primary light source providing an indication that it is not operational.

28. The processor-readable medium of claim 26 wherein the determining is performed by a sensor configured to measure a physical condition of the primary light source indicating operational status of the primary light source.

29. The processor-readable medium of claim 26 wherein the projecting is from a set of mirrors.

30. The processor-readable medium of claim 26 wherein the projecting is performed by manipulating a set of mirrors to reflect fault information conditions.

31. The processor-readable medium of claim 26 wherein the projecting is through a color prism.

32. The processor-readable medium of claim 26 wherein the projecting is performed by receiving a transmitted light message from a light template conveying the message.

33. A projection system comprising:

means for determining a condition of a primary light source;

means for activating a backup light source if the condition of the primary light source is determined to be non-operational;

means for conveying a message; and means for providing a message to a screen using light from the backup light.

34. The projection system of claim 33 wherein the means for determining is performed by a sensor.

35. The projection system of claim 33 wherein the means for determining is performed by the primary light source providing an indication of its condition.

36. The projection television system of claim 33 wherein the means for providing a message is performed by reflecting a message off a set of mirrors.

37. The projection television system of claim 33 wherein the means for providing a message is performed by reflecting a transmitted light message through a light template off a set of mirrors.

38. The projection system of claim 33 wherein the means for providing a message is performed by manipulating a set of mirrors to reflect the message wherein the message is part of fault information of the projection system.

39. The projection system of claim 33 wherein the message conveys that the primary light source is non-operational.

40. The projection system of claim 33 wherein the message conveys contact information of a service party.

41. The projection system of claim 33 wherein the message conveys fault information used to correct the non-operational condition of primary light source.

* * * * *